(12) United States Patent
Van Duyn

(10) Patent No.: US 6,170,252 B1
(45) Date of Patent: Jan. 9, 2001

(54) LOCATOR FOR A GEARBOX MOUNT

(75) Inventor: Keven G. Van Duyn, Bloomfield, CT (US)

(73) Assignee: United Technologies Corporation, Hartford, CT (US)

( * ) Notice: Under 35 U.S.C. 154(b), the term of this patent shall be extended for 0 days.

(21) Appl. No.: 09/211,293

(22) Filed: Dec. 14, 1998

(51) Int. Cl.⁷ .................................................... F02C 7/20
(52) U.S. Cl. ............................ 60/39.31; 60/226.1; 60/223
(58) Field of Search .................. 60/39.31, 39.32, 60/39.33, 39.091, 226.1, 223; 244/54

(56) References Cited

U.S. PATENT DOCUMENTS

| | | | |
|---|---|---|---|
| 2,722,391 | * 11/1955 | Krieghoff | ................................ 244/54 |
| 2,951,395 | 9/1960 | Smith et al. | . |
| 2,978,869 | * 4/1961 | Hiscock et al. | ...................... 60/39.31 |
| 3,568,806 | 3/1971 | Butt | . |
| 3,710,568 | * 1/1973 | Rice | ..................................... 60/39.31 |
| 3,907,220 | * 9/1975 | Amelio | .................................. 60/39.31 |
| 4,301,989 | 11/1981 | Kallenbach | . |
| 4,517,913 | 5/1985 | Albertini et al. | . |
| 5,078,342 | 1/1992 | Langley et al. | . |
| 5,277,382 | 1/1994 | Seelen et al. | . |
| 5,303,880 | 4/1994 | Cencula et al. | . |
| 5,435,124 | 7/1995 | Sadil et al. | . |
| 5,524,847 | 6/1996 | Brodell et al. | . |
| 5,529,276 | 6/1996 | Szablya | . |
| 5,649,417 | 7/1997 | Hey | . |
| 5,725,181 | 3/1998 | Hey | . |
| 5,813,674 | 9/1998 | Dickie et al. | . |

* cited by examiner

Primary Examiner—Ted Kim

(57) ABSTRACT

A locator for a gearbox mount for a gas turbine engine includes a mounting plate having a first stub shaft that extends from the plate into a receptacle in the gearbox, a second stub shaft that extends from the plate into a receptacle in the engine case and a load sensitive mechanism disposed in either one of the stub shafts. During a high rotor imbalance event such as a fan blade loss condition, the load sensitive mechanism shears to partially decouple the gearbox from the engine case to minimize damage caused by high rotor imbalance loads. Alternate embodiments of the load sensitive mechanisms in the stub shaft are disclosed, including a diaphragm and a wall that yield to shear loads.

4 Claims, 2 Drawing Sheets

LOCATOR FOR A GEARBOX MOUNT

TECHNICAL FIELD

The present invention relates to gas turbine engines, and more particularly to providing a mounting arrangement for a gearbox of the engine to minimize damage to the gearbox in the event of a high rotor imbalance condition such as a fan blade loss.

BACKGROUND ART

Modem gas turbine aircraft engines have a gearbox that is mounted on their external cases. The gearbox is generally positioned under the engine's core or fan case and uses power from the engine to drive the major accessories needed for engine functions, such as generators for electricity, pumps for circulating fluids and heat exchangers for cooling oil or heating fuel. The accessories are frequently mounted on the gearbox.

The main gearbox of modem turbofan engines such as the Model PW4000, manufactured by the Pratt & Whitney Division of United Technologies Corporation, is mounted within the engine core cowl and is driven by an angle gearbox through a towershaft from the high-pressure compressor. Various components are mounted on the gearbox. The main gearbox drives the fuel pump, scavenge pump, the electrical generator for the electronic engine control, external deoiler, hydraulic pump, and the integrated drive generator (for producing electricity).

Various mounting arrangements are used to mount the gearbox to the external case. The gearbox is often connected to the engine case at two or more locations along the length of the gearbox. For example, a forward V-shaped link may be used to fasten the front of the gearbox to the engine. A plurality of side hanger links may be used on either side of the gearbox housing to stabilize the gearbox. Further, a locator may also be used to provide alignment of the gearbox with respect to the engine case and prevent undesirable movement of the gearbox relative to the engine. Thus, the gearbox may be connected to the engine by a hard mount, that is, a connection which is essentially inflexible and immobile such that case deflections are transmitted to the gearbox. This hard mount arrangement imposes undesirable loads on the mounting hardware and on the gearbox itself.

One problem caused by such arrangements for mounting the gearbox to the engine case is subjecting the gearbox to high loads caused by rotor imbalances. Severe rotor imbalance can occur in an engine, particularly after a fan blade breaks off from the rotor assembly. One cause of fan blade loss is impact with foreign objects, such as birds, hailstones or other objects which, on occasion, are ingested into the engine. The detached fan blade is thrown outwardly and passes through the fan case, but is typically caught by the fabric wraps in the fan containment case assembly. Blade loss produces an imbalance in the rotor and causes the rotor shaft to deflect radially outwardly. The more the rotor deflects, the greater is the radial load on the rotor bearing supports.

The rotor imbalance loads are transmitted from the bearing supports to the engine cases and ultimately to the gearbox fastened to the engine case. The gearbox is forced to move with the engine as the gearbox is fastened to the engine cases. Blade loss loads have been traditionally underestimated with respect to gearbox structural design. If the vibratory loads transmitted to the gearbox are high, the gearbox may not be able to sustain the imbalance loads and this may result in the failure of the gearbox housing itself, and often the liberation of the accessories themselves from the gearbox.

When the gearbox housing breaks, oil from within the gearbox may splash over the hot cases of the engine and immediately ignite, causing a fire. The release of oil from within the gearbox also potentially damages the internal components of the gearbox as they would have to operate without lubrication. If a fuel-bearing accessory breaks off from the gearbox or pulls apart, spilled fuel may cause a fire. If the generator pulls off, a very large component is liberated that can potentially break through the engine cowling itself and ultimately hit an aircraft control surface.

Consequently, gearbox housings have been made thicker, the mount points stronger, and other strength and durability requirements have been increased. However, these prior art solutions have resulted in substantially heavier hardware which in turn has resulted in the gearbox mount loads to increase. In turn, the efficiency of the engines is adversely impacted by such heavier hardware.

It is also known to use a mounting arrangement having some flexibility or mobility to absorb energy and thus prevent the gearbox from engine case deflections and distortions. However, the flexible mounting arrangements of the prior art adversely compromise the life of the hardware as the elastomeric materials used to introduce the desired flexibility harden when cycled in a high temperature environment.

Thus, the challenge for modem gas turbine engines, during fan blade loss events, is the limiting of damage to the gearbox mounts and the gearbox itself.

DISCLOSURE OF THE INVENTION

A primary object of the present invention is to provide a gearbox mounting arrangement that protects the gearbox from the undesirable effects of engine case deflections and distortions experienced during rotor imbalance events such as a fan blade loss condition.

According to the present invention, a locator for a gearbox mount for a gas turbine engine includes a mounting plate having a first stub shaft that extends into a receptacle in the gearbox, a second stub shaft that extends into a receptacle in the engine case, and a load sensitive mechanism in one of the stub shafts such that during a high rotor imbalance condition, the load sensitive mechanism yields to a lower stiffness and restraint level to partially decouple the gearbox from the engine case to minimize damage caused by high deflection loads.

A primary advantage of the present invention is the minimization of damage to the gearbox housing and accessories during large rotor imbalance conditions, such as in the event of a fan blade loss. The locator of the present invention provides acceptable means of controlling loads transmitted to the gearbox. A further advantage of the gearbox mount of the present invention is its ability to provide an appropriate locating structure for the gearbox during normal operating conditions. The locator for a gearbox mount of the present invention provides proper alignment of the gearbox drive systems and minimal relative engine-to-gearbox motion. Another advantage is the ease and cost of manufacturing and incorporating into the gearbox of the prior art the locators of the present invention. The simplicity of the structure of the gearbox locators and the use of economic and readily available materials, allows for cost effective manufacturing processes. Further, gearboxes of the prior art can be retrofitted to include the present invention in a cost-effective manner as the present invention fits into the envelope of prior art gearboxes. The mounting arrangement of the present invention does not require periodic maintenance and is, thus, cost effective to incorporate into prior art engines. The gearbox housing can be made lighter as the strength of the gearbox housing does not have to be increased due to the present invention. As a result, the use of the mounting arrangement of the present invention is beneficial to the efficiency of the engine.

The foregoing and other objects, features and advantages of the present invention will become more apparent in the following detailed description of the best mode for carrying out the invention and from the accompanying drawings which illustrate an embodiment of the invention.

BEST MODE FOR CARRYING OUT THE INVENTION

Figure 1:
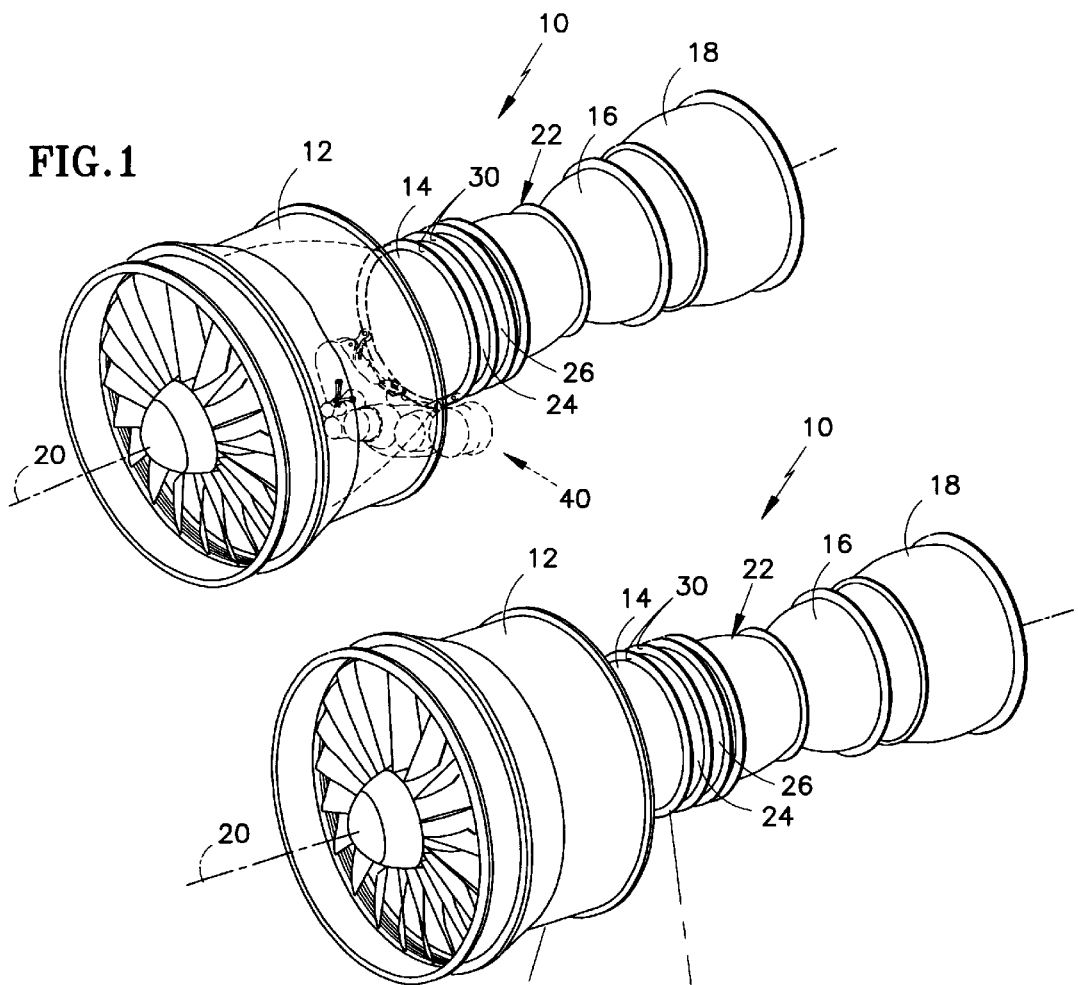
FIG. 1 is a perspective view of a typical axial flow, turbofan engine showing a gearbox mounted to the engine's external case.

Referring to FIG. 1, a gas turbine engine 10 includes as its principal components a fan section 12, a compression section 14, a combustion section 16 and a turbine section 18. The compression and turbine sections each contain one or more stages of a compressor and turbine (not shown) which rotate about a central rotational axis 20. The principal components are circumscribed by an essentially cylindrical external case 22 which serves as a main structural support for the engine. The external case is usually constructed of individual case sections, such as case sections 24 and 26, which are joined together at bolted flanges such as flange 30. A gearbox 40 is mounted to the external case section 22.

Figure 2:
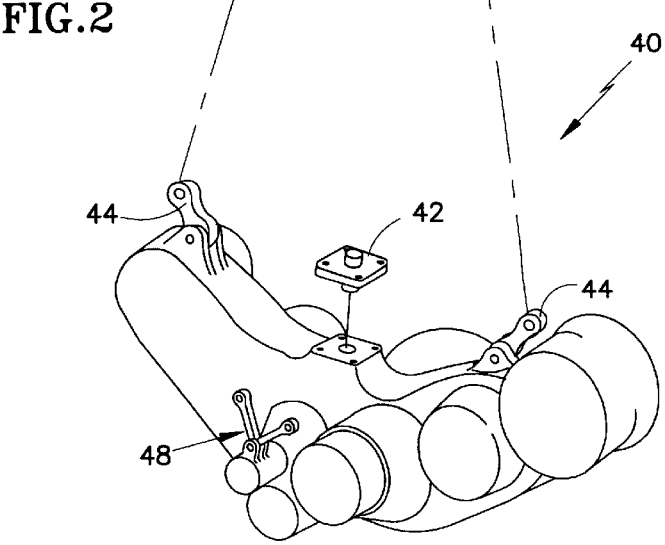
FIG. 2 is a perspective view of the gas turbine engine of FIG. 1 with an enlarged, exploded view of the gearbox.
Figure 3:
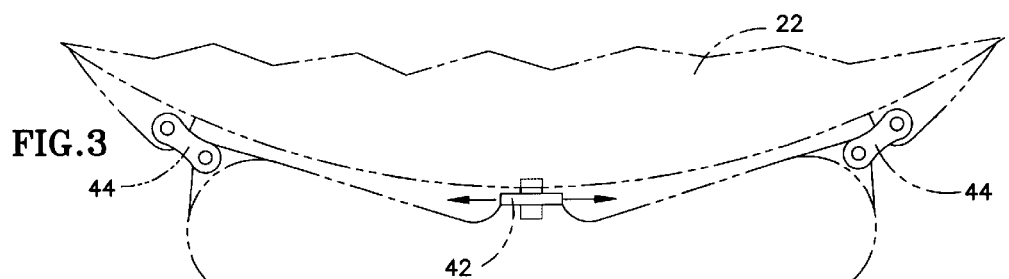
FIG. 3 is a view showing a prior art locator for the gearbox housing.

Referring to FIGS. 2 and 3, the gearbox 40 is mounted to the external case by locator 42, and side hanger links 44. The gearbox is also attached to the engine by the V-shaped link 48 axially forward of the locator 42 and hanger links 44. The mounts may be hard mounts which connect the gearbox 40 to the engine case by essentially inflexible, immobile connections that transmit case deflections and distortions to the gearbox. During a blade loss event, loads transmitted throughout the engine can be extremely high. It is often very difficult to maintain structural integrity of the gearbox whose case and housing are often made of lightweight, but low strength materials such as aluminum. In the prior art, the problem of sustaining high loads was solved by reducing the blade loss loads, or by strengthening the accessory housing which significantly increases the engine weight or by using flexible mounting arrangements which would have a limited life due to exposure of the flexible materials to a high temperature environment.

Figure 4:
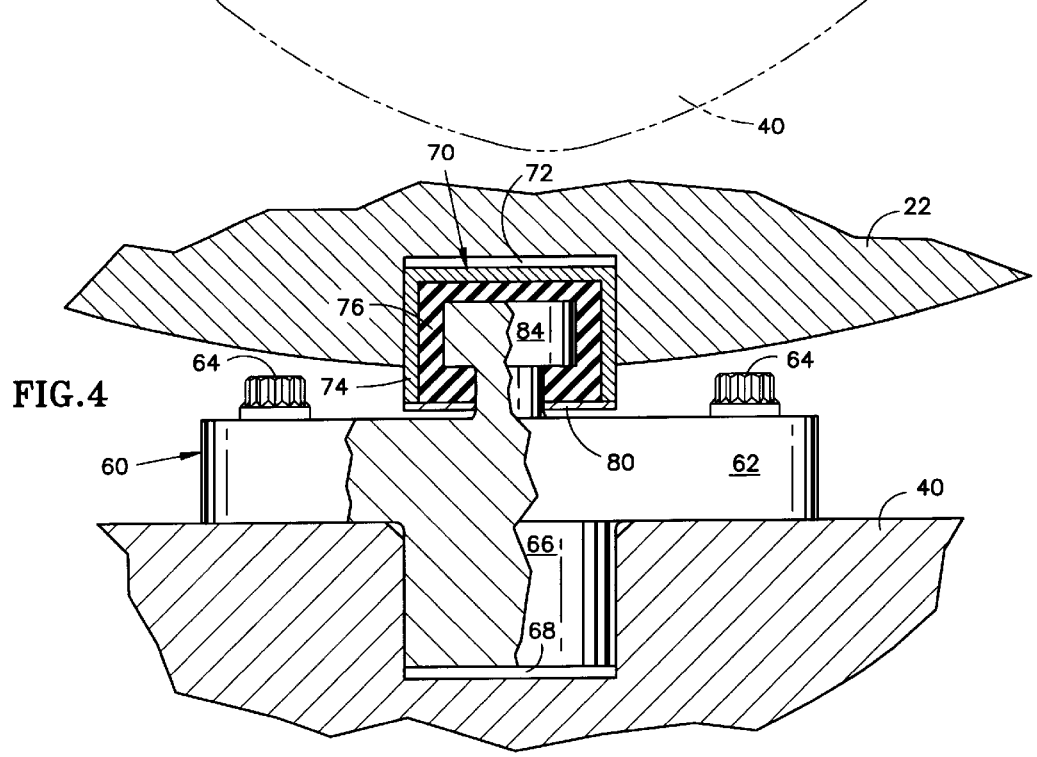
FIG. 4 is a schematic view, partly in cross section, showing an exemplary embodiment of the locator of the present invention.

Referring to FIG. 4, a preferred embodiment of the locator 60 for a gearbox mount of the present invention maintains the alignment of the gearbox to the engine case. The locator 60 has a plate 62 bolted to the gearbox by bolts 64. A first stub shaft 66 is integral with, or rigidly attached to the plate 62 by welding or brazing and is received within a receptacle 68 in the gearbox 40. A second stub shaft 70 is received within a receptacle 72 in the engine case 22. The stub shaft 70 comprises a chamber 74 defined by a cup-shaped lateral and upper end wall structure filled with an elastomer 76. The cup-shaped chamber 74 is enclosed at the bottom by a frangible diaphragm 80. The stub shaft 70 is coupled to the plate 62 by a spar 84 which, like stub shaft 66, is integral with, or rigidly attached to the plate 62 by welding or brazing. This diaphragm 80 is load sensitive and may be formed from a nickel-based alloy or from stainless steel. The diaphragm thickness may range from 0.05 to 0.1 inches. The diaphragm is sized to shear at an appropriate shear load condition which is less than the destructive load level of the gearbox. The loads vary based on engine type, thus the diaphragm sizing differs for particular engines. It may be sized to shear within a range of fifty to seventy-five percent of the load that would otherwise be destructive to the gearbox.

During operation when the engine experiences a high rotor imbalance such as during a fan blade loss condition, the engine case 22, the gearbox 40 and, in turn, the diaphragm 80 in the stub shaft experience high shear loads. As a result of the shear loading, the diaphragm 80 shears as the spar 84 of the stub shaft 70 tears the diaphragm. As the diaphragm is torn, the spar 84 is allowed to move in the chamber 74 filled with the elastomer 76. The elastomer 76 yields to allow for some movement of the spar which partially decouples the gearbox from the engine case. The partial decoupling prevents the bulk of the loads from being transmitted from the engine case to the gearbox. A portion of the loads that are transmitted to the gearbox are accommodated by the elastomer which provides for a lower spring rate support mechanism, allowing for adequate mounting support with enhanced isolation of the gearbox from the engine case.

Figure 5:
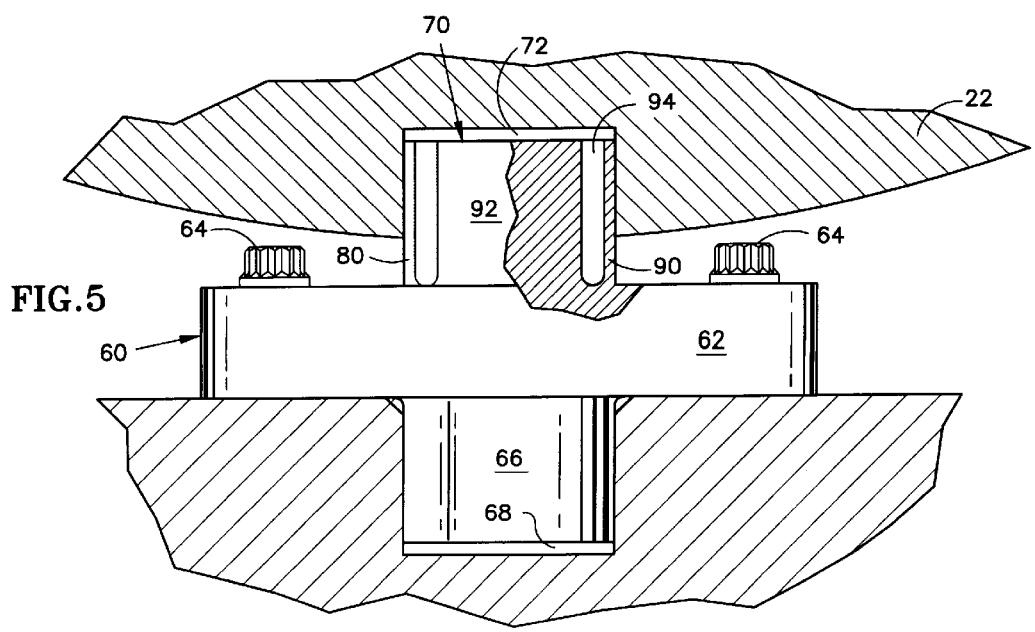
FIG. 5 is a schematic view, partly in cross section, showing a second exemplary embodiment of the locator of the present invention.

Referring to FIG. 5, a second embodiment of the locator of the present invention comprises a stub shaft 70 which includes a thin frangible wall 90 and an inner mid-portion or spar 92 which is integral with or rigidly attached to the plate 62 by welding or brazing. The shearable wall 90 yields when a shear load is applied thereto such as during a fan blade loss event. The wall is sized to shear at an appropriate load level. The loads vary based on engine type, thus the sizing of the shearable wall differs for particular engines. The wall may be sized to shear within a range of approximately fifty to seventy-five percent of the load that would otherwise be destructive to the gearbox. Once the thin wall 90 shears, the spar 92 can move freely in the allowable gap or space 94 left by the sheared walls. The gap 94 partially decouples the attachment of the gearbox to the engine case. Isolation of the gearbox is provided by the reduced gearbox restraint.

Similar to the events described heretofore with respect to the embodiment including a diaphragm 80, during engine operation when the engine experiences high rotor imbalance loads such as during a fan blade loss event, the engine case, the gearbox and, in turn, the shearable wall 90 experience high shear loading. The wall shears and the spar 92 of the stub shaft 70 is then allowed some movement due to the gap 94 which partially decouples the gearbox from the engine. The partial decoupling prevents the bulk of the loads from being transmitted from the engine case to the gearbox. A portion of the loads that are transmitted to the gearbox are handled by the movement of the spar. The present invention, thus, maintains the required mounting support but has a larger deflection capability.

A primary advantage of the present invention gearbox locator is a minimization of damage to the gearbox thus, resulting in a durable gearbox in the event of large rotor imbalance, such as a fan blade loss. A further advantage of the present invention is its ability to provide an appropriate location of the gearbox during both normal operation and a fan blade loss event. The locator of the present invention provides proper alignment of the gearbox drive systems and minimal motion between the engine and gearbox interface. Another advantage is the ease and cost of manufacturing and incorporating the present invention. The simplicity of the structure and the use of economical materials allows for cost effective manufacturing processes. Further, current, prior art gearboxes can be retrofitted to include the gearbox locator in a cost-effective manner. The present invention fits into the envelope of prior art gearboxes. By incorporating the present invention gearbox locator, current engines limit damage to the gearbox housing during high rotor imbalance events.

The locator for a gearbox mount of the present invention may be implemented in a variety of ways. The locator of the present invention has been described as having two embodiments—one having a shearable diaphragm and another having a shearable wall. These embodiments are purely exemplary. Other materials may be used to provide reduced stiffness for the locator mount such as any softer metal compared to the case and gearbox housing or a honeycomb structure. Other configurations of the present invention may be utilized in light of the teachings herein such as in the case of the shearable wall embodiment, the air gaps could be filled with an elastomer or honeycomb material. Further, the embodiments of the present invention have been described as having the load sensitive mechanisms disposed in the stub shaft that is received within the engine case. It should be understood that the stub shaft that is received within the gearbox can alternatively include the load sensitive mechanisms.

Although the invention has been shown and described with respect to detailed embodiments thereof, it should be understood by those skilled in the art that various changes in form and detail thereof may be made without departing from the spirit and the scope of the claimed invention.

What is claimed is:

1. A locator for a gearbox of a gas turbine engine having an engine case, comprising
    a mounting plate fixed to one of said gearbox and engine case, said mounting plate including one stub shaft extending from the plate and received by the gearbox,
    a second stub shaft extending from the plate and received by the engine case,
    one of said stub shafts including a load sensitive mechanism,
    said load sensitive mechanism being adapted to shear during a high rotor imbalance event to partially decouple the gearbox from the engine case to protect the gearbox from undesirable effects of case deflections and distortions.

2. The mounting arrangement of claim 1, wherein said load sensitive mechanism comprises a chamber defined by a cup-shaped wall structure, the chamber being at least partially enclosed by a diaphragm, said one stub shaft further including a spar disposed in the chamber, wherein the diaphragm shears when subjected to loads associated with a high rotor imbalance condition and allows for the movement of the spar in the chamber to partially decouple the gearbox from the engine case.

3. The mounting arrangement of claim 2, wherein the chamber is filled with an elastomer which provides a reduced stiffness of said one stub shaft when the diaphragm shears.

4. The mounting arrangement of claim 1, wherein the load sensitive mechanism further comprises a thin wall in the stub shaft that shears when subjected to loads associated with a high rotor imbalance condition.

* * * * *